United States Patent [19]

Moritz et al.

[11] Patent Number: 5,317,245
[45] Date of Patent: May 31, 1994

[54] BRUSHLESS DC MOTOR CONTROL NETWORK

[75] Inventors: Frederick G. Moritz, Hauppauge; Roger Mosciatti, Coram, both of N.Y.

[73] Assignee: MFM Technology, Inc., Ronkonkoma, N.Y.

[21] Appl. No.: 968,339

[22] Filed: Oct. 29, 1992

[51] Int. Cl.$^5$ .............................................. H02P 6/02
[52] U.S. Cl. ................................................... 318/254
[58] Field of Search ...................... 318/138, 254, 439; 323/222, 223, 265; 363/34, 44, 45, 47, 48

[56] References Cited

U.S. PATENT DOCUMENTS

| | | |
|---|---|---|
| 3,577,059 | 5/1971 | Kelly, Jr. . |
| 3,584,279 | 6/1971 | Krauthamer . |
| 3,772,588 | 11/1973 | Kelly et al. . |
| 4,510,422 | 4/1985 | Ogura ................ 318/254 |
| 4,583,028 | 4/1986 | Angersbach et al. ........... 318/254 |
| 4,763,049 | 8/1988 | Magee ................ 318/138 |
| 4,827,196 | 5/1989 | Odell ................ 318/254 |
| 5,063,338 | 11/1991 | Capel et al. ........... 318/685 |
| 5,136,220 | 8/1992 | Philipp ................ 318/362 |
| 5,189,349 | 2/1993 | Haga ................ 318/254 |

Primary Examiner—Bentsu Ro
Attorney, Agent, or Firm—Howard C. Miskin

[57] ABSTRACT

A power control and commutation network for a brushless DC motor includes a first section proximate the motor and a second section remote from and connected to the first section by a pair of conductors. Included in the first section is a servo control amplifier defining a main motor power supply and, in the second section, a polyphase brushless DC motor, a commutation module, an auxiliary power supply for the module, motor rotor position sensors and a switching network, the motor stator coils being connected through the switching network to the conductors. The amplifier may have an amplitude modulated DC output and the output of a high frequency oscillator in the second section is AC coupled to the conductors and the auxiliary power supply with its input is AC coupled between the conductors. Alternatively, the amplifier is PWM and the auxiliary power supply includes a rectifier with an input connected across the conductors and a voltage regulator controlling the output voltage.

14 Claims, 4 Drawing Sheets

BRUSHLESS DC MOTOR CONTROL NETWORK

BACKGROUND OF THE INVENTION

The present invention relates generally to improvements in electric motor control networks and it relates particularly to an improved brushless DC motor control network.

The use of DC brushless motors is highly desirable in many applications. Such motors obviate the need for electromechanical commutation brushes while permitting continuous motor speed and/or torque adjustment and regulative while eliminating the drawbacks of the brush-type DC motor. They are highly versatile and adaptable, rugged, reliable and stable under many ambient conditions. However, it is frequently desirable to locate the motor voltage supply remote from the motor and in the conventional brushless DC motor control networks necessitates the need for a large number of long conductors extending from the area of the motor voltage supply to the other components of the network in the area of the motor.

SUMMARY OF THE INVENTION

A principal object of the present invention is to provide an improved electric motor control network.

Another object of the present invention is to provide an improved DC brushless motor control network.

Still another object of the present invention is to provide an improved DC brushless motor control network wherein the motor control component is remote from the motor.

A further object of the present invention is to provide an improved brushless motor control network of the above nature characterized by its wide range of application, convenience, low cost, high reliability and great versatility and adaptability.

The above and other objects of the present invention will become apparent from a reading of the following description taken in conjunction with the accompanying drawings which illustrate preferred embodiments thereof.

A brushless DC motor apparatus in accordance with the present invention includes a polyphase brushless motor having stator coils and a rotor, a main voltage supply, a signal responsive switching network for alternately connecting preselected stator coils to the motor voltage supply, sensors for detecting the angular position of the motor rotor and a commutation circuit responding to the sensors for applying commutation control signals to the switching network, the apparatus being characterized by the motor, sensors, and switching network and commutation circuit being located in a first section and the main voltage supply being located in a second section remote from the first section and having an output including a periodically varying component and further including a pair of conductors connected to the motor voltage supply output and extending to the second section, and an auxiliary voltage power supply having an input AC coupled to the conductors and a DC output energizing the commutation circuit.

The main power supply may include a DC voltage supply source whose output is connected to the conductors through a low pass filter such as inductors and a high frequency oscillator, preferably of between 200 and 500 kilohertz, AC coupled to the conductors. The DC voltage supply output may be manually adjusted or may vary in response to an input control signal responding to a parameter of equipment driven by the motor or by a motor operation parameter. A high frequency oscillator, for example, between 200 and 500 kilohertz, has its output AC coupled to the conductors. Alternatively, the motor driving voltage supply source may have a pulse width modulated output and the high frequency oscillator is thus obviated.

The improved DC brushless motor control network is simple and reliable and is of great versatility and adaptability.

DESCRIPTION OF THE PREFERRED EMBODIMENT

Figure 1:
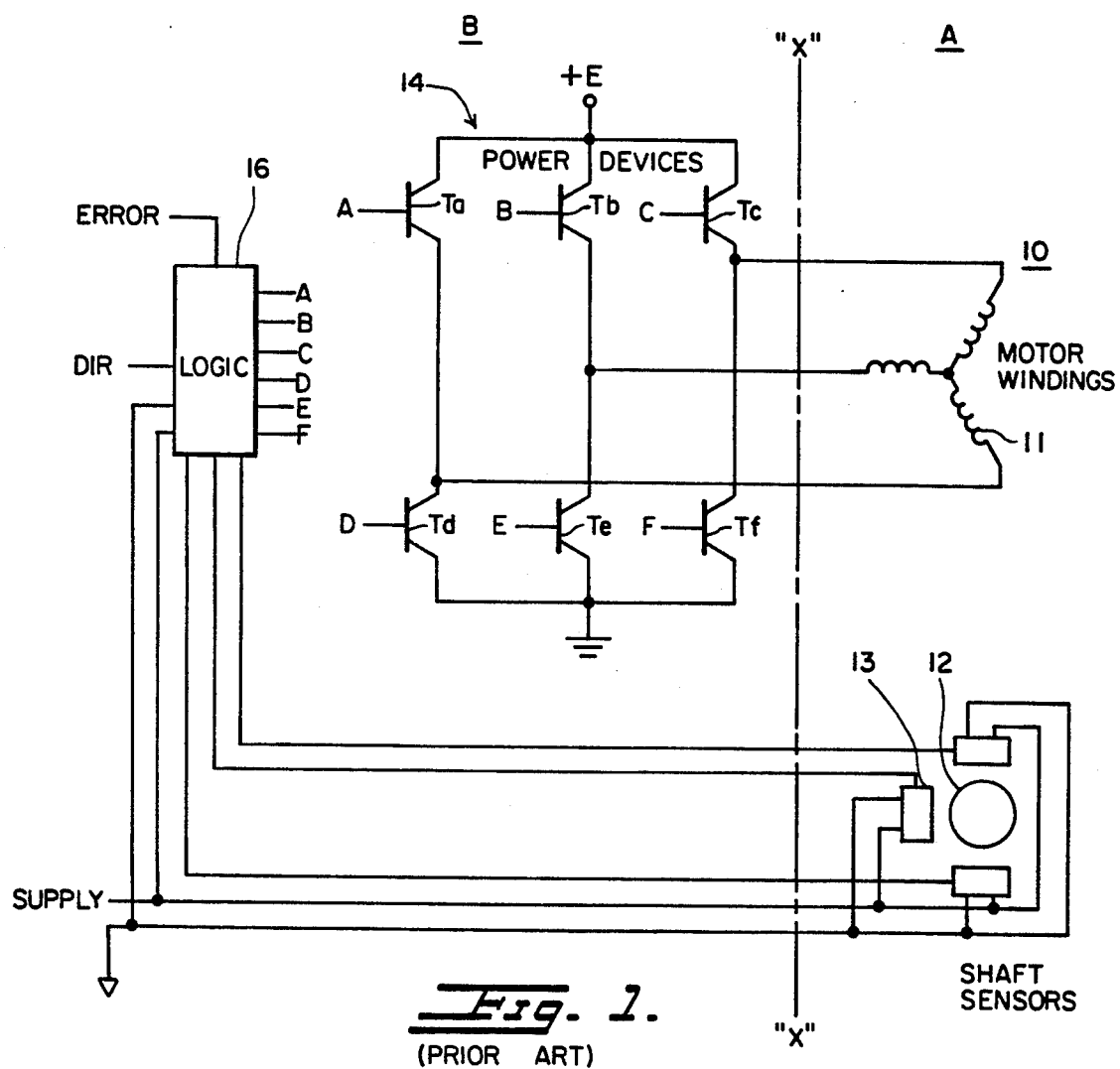
FIG. 1 is a circuit diagram of a prior art control network of a polyphase DC brushless motor.

Referring now to FIG. 1 of the drawings which illustrates a prior art circuit of conventional construction applied to the control and energization of a polyphase DC brushless motor, the reference numeral 10 generally designates the motor stator winding which includes, by way of example, three stator coils 11 which are Y-connected and have a common junction and outer terminals and reference numeral 12 designates the motor rotor which is of the permanent magnet type. The control network is divided into two sections as delineated by broken line X—X, a first section A located proximate the motor, and including angularly spaced sensors 13, for example, Hall effect transistors, responsive to the angular rotational position of motor rotor 13 and a second section B including a motor-energizing DC power supply, for example, a power amplifier which may be amplitude modulated or pulse width modulated or other amplifier responsive to an input signal and/or being manually adjustable. The power supply output is connected through a switch network 14 to the outer terminals of stator coils 11, switch network 14 including parallel pairs of series connected signal responsive switch elements $T_{1-6}$, the junctions of the outputs of each switch element pair being connected to a respective stator coil terminal. The switch elements may be transistors, thyristor or the like whose bases or control electrodes are connected to respective output terminals of a commutation logic or computer processor module 16. The module 16 is of well known construction and includes inputs connected to a module energizing power supply control inputs connected to respective sensors 13, an error signal input and a direction input.

The operation of the above-described prior art control network is well known. The network, however, posses an important drawback. A large number of conductors of great length, depending primarily on the distance between the first and second network sections, are required, in the case of the illustrated three-phase motor, eight such conductors. This is awkward, inconvenient and expensive and limits the versatility, adaptability and application of the control network.

Figure 2:
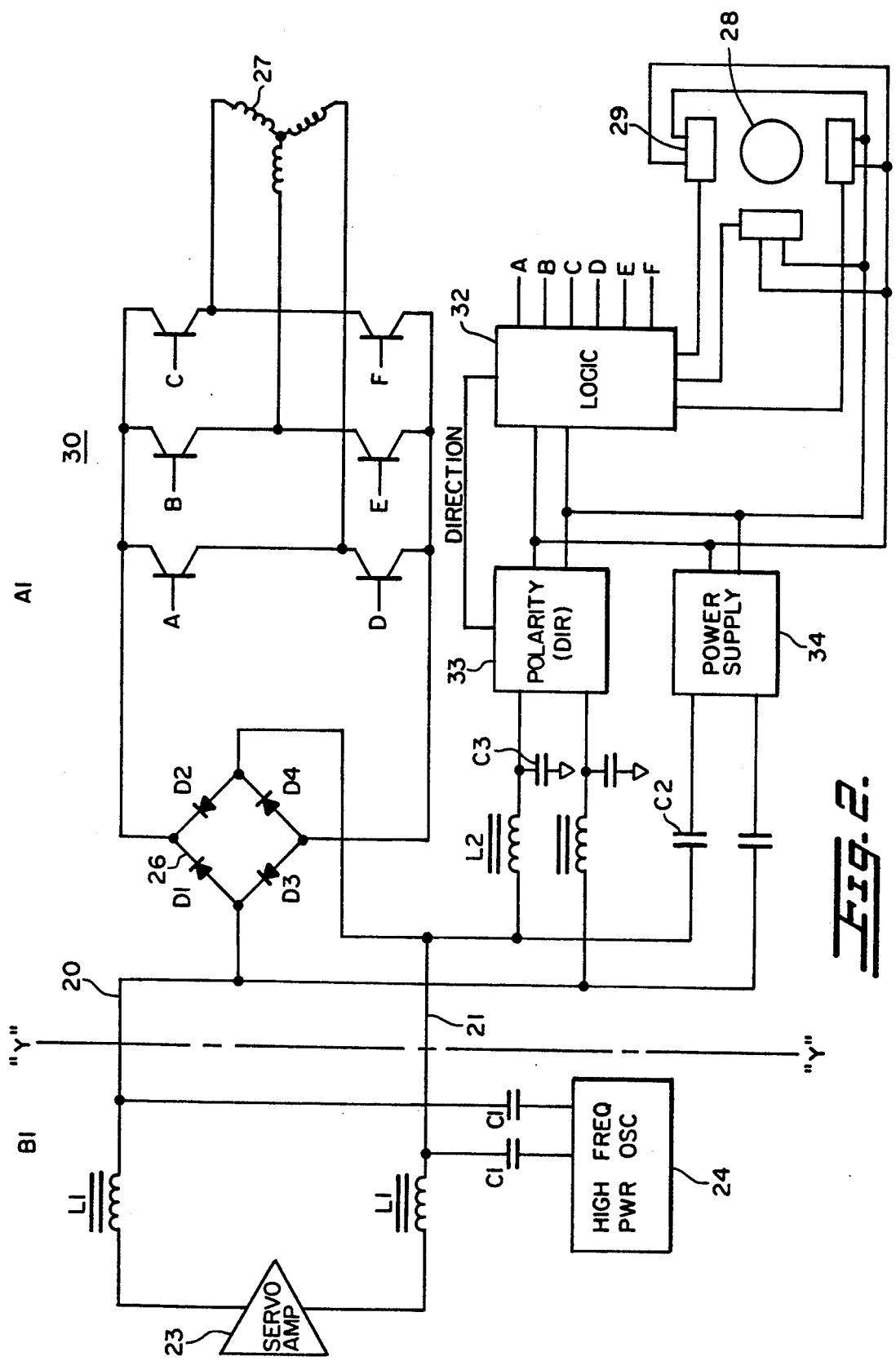
FIG. 2 is a circuit diagram of a control network for a polyphase DC brushless motor embodying the present invention.

The network illustrated in FIG. 2 of the drawings overcomes the drawbacks of the conventional motor control network described above and includes two sections delineated by broken line Y—Y, a first section A1 proximate to the controlled motor, preferably located directly on the motor or housing and a second section B1 located remote from section A1, preferably proximate the equipment driven by or associated with the motor. Sections A1 and B1 are interconnected by a pair of conductors 20, 21 whose lengths depend on the distance separating sections A1 and B1.

The second section B1 includes a main power supply defined by a servo power amplifier 23 having an amplitude modulated output responsive to an input control signal and/or manually, the amplifier output being connected through inductors L1 to respective conductors 20, 21 defining a low pass filter. Also connected across conductors 20, 21 through respective capacitors C1 following inductors L is the output of a high-frequency power oscillator 24, the frequency of the oscillator preferably being between 100 Khz and 500 Khz.

The first section A1 includes a rectifier 26, a polyphase DC brushless motor having Y-connected stator coils 27, a permanent magnet rotor 28, three rotor angular position sensors 29, a signal responsive stator coil switch circuit 30, a commutation logic module 32, a direction polarity control circuit 33 and an auxiliary DC power supply 34. The components 26 to 33 are of conventional construction and association and are powered by the output of auxiliary power supply 34 which may be voltage regulated. The input to power supply 34 is connected through capacitors C2 between conductors 20, 21 respectively and the polarity or direction control circuit 23 has its signal input connected through inductors L2 between conductors 20, 21 and is grounded through capacitors C3 which with inductors L2 define a low-pass filter. The output of auxiliary power supply 34 is connected to the energizing inputs of sensors 29, 34, direction control circuit 33, and commutation module 32.

Except for the provision of the auxiliary power supply 34 which energizes the motor control circuit and the arrangement of the input to the auxiliary power supply, the operation of the DC brushless motor network described above is conventional. However, by the provision of the auxiliary power supply and its relationship to the main power supply, the motor proximate and motor remote sections of the network are connected by a single pair of conductors as contrasted to the large number of conductors normally required.

Figure 3:
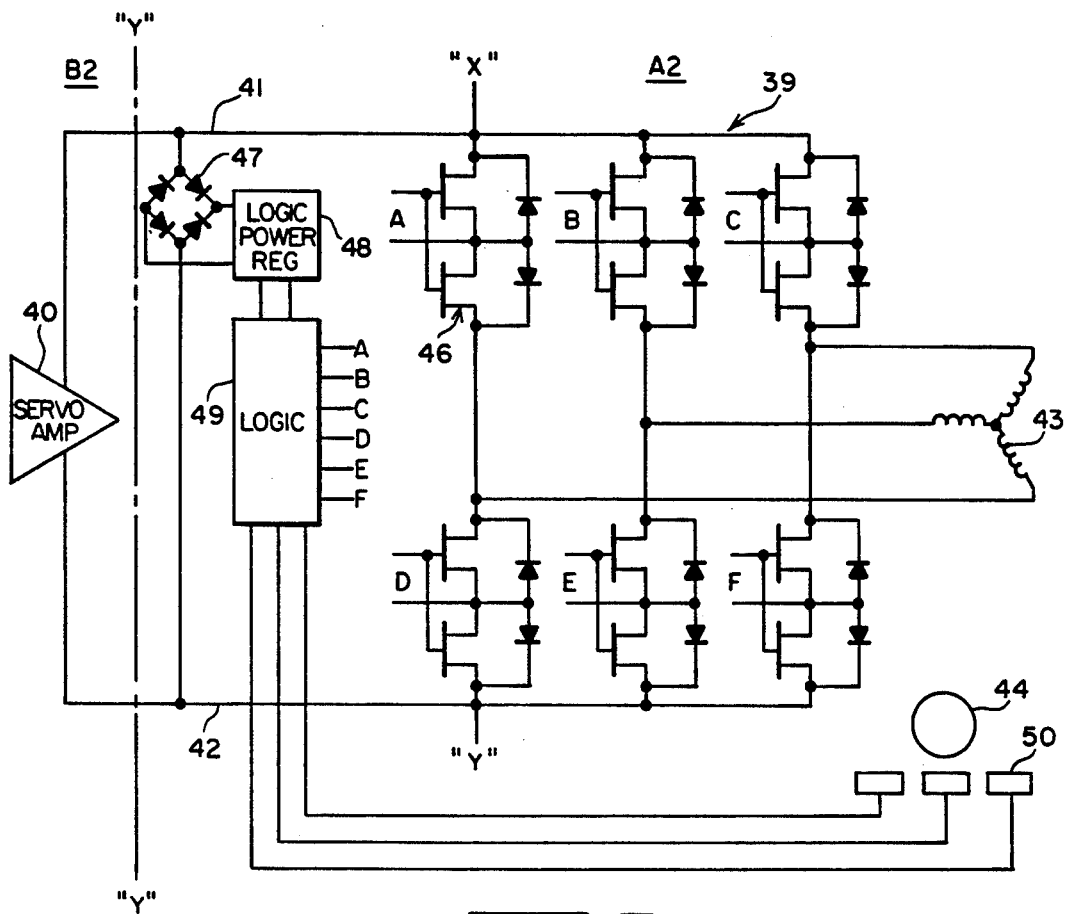
FIG. 3 is a current diagram of another embodiment of the present invention.
Figure 4:
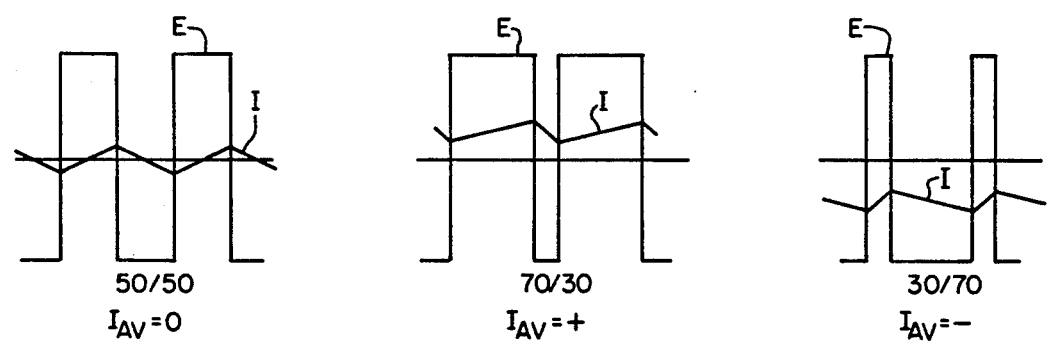
FIG. 4 is a diagram of the waveform of the motor current and voltage of the network of FIG. 3.

In FIG. 3 of the drawings, there is illustrated another embodiment of the present invention in which the high frequency power oscillator 24 in the last described embodiment and its associated components are obviated. Specifically, the main power supply 40 is included in the second section B2 which is remote from section A2 which is proximate the controlled DC brushless motor and is a PWM (pulse width modulated) amplifier which has a 50/50 duty cycle for the zero torque or null condition and whose output is automatically controlled by a control input signal and/or is manually controlled. The output of amplifier 40 is connected between a pair of conductors 41,42 which extends between sections B2 and A2. The modulated output of amplifier 40 is shown in FIG. 4 in which E represents the pulse width modulated output voltage and I represents the current delivered through a switching network 39 to respective Y-connected stator coils 43 of the DC brushless motor which includes a rotor 44. The stator coil switching network is shown by way of example as including six pair of bilateral power switches 46 formed of back-to-back MOSFET or IGBT transistors or the like. The power output junction of each back-to-back pair of switches 46 is connected to the outer terminal of a respective stator coil 43.

The brushless DC motor is located in section A2 as are a bridge rectifier, a voltage power regulator 48, a commutator logic circuit or module 49, switch network 46 and sensors 50 responsive to the angular position of rotor 44. The rectifier 47 has its input connected between conductors 41, 42 and its DC output connected through logic power regulator 48 to the power input of commutation module 49. The rotor position sensors 50 are connected to respective control terminals of module 49 whose controlled output terminals A–F are connected to respective control electrodes of each switch pair 46.

As shown in FIG. 4 in the null or zero voltage average of the output voltage E of PWM amplifier 40, the average current I is alternating and averages zero; when the positive pulse width is longer than the negative pulse width, the average current I is in one direction and, when the negative pulse width is wider than the positive pulse width, the average DC current is in an opposite direction. In the case of the wider positive pulse width, the motor rotation is in one direction and, when the negative pulse width is wider, the motor rotation is in an opposite direction thereby obviating the need for a motor direction control signal to commutation module 49. Except for the network for powering the commutation network and the locations of the network components as described above the operation of the commutation network of the DC brushless motor is well known. Thus, only a two conductor cable is required between the main power source 40 and the remainder of the motor control network.

Figure 5:
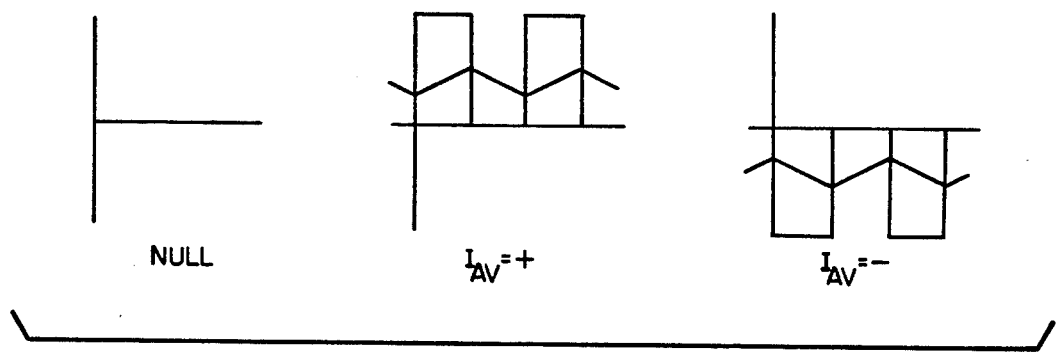
FIG. 5 is a diagram similar to FIG. 4 of the network of FIG. 5 in another operation mode.

The servo amplifier 40 in the network shown in FIG. 3 may be of a type operated on a zero voltage current mode in the null or non-torque condition as illustrated in FIG. 5. As shown in FIG. 5, output voltage only appears positive or negative in non-null conditions energize the stator coils to drive the motor clockwise or counterclockwise respectively. In this operation mode in the null condition, the commutation module is not powered but, since the motor in this condition is at a standstill, no commutation module power is required, but as soon as the power amplifier has a voltage output, the commutation module is adequately powered and provides the required control signals for the stator coils switching network.

Figure 6:
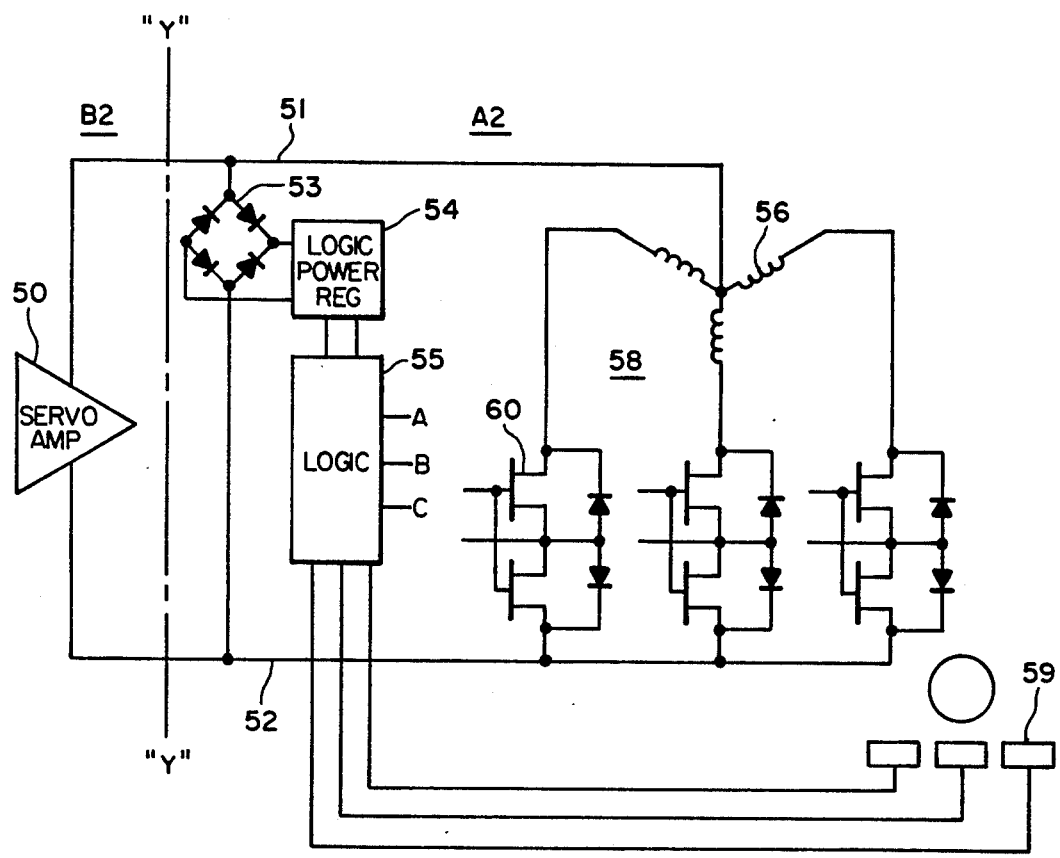
FIG. 6 is a circuit diagram of a further embodiment of the present invention.

In FIG. 6 of the drawing, there is shown another embodiment of the present invention which differs from that last described only in that the stator coils are individually commutated instead of in pairs. Specifically, sections A2 and B2 are widely spaced and delineated by broken line Y—Y, section A2 being proximate the DC brushless motor and section B2 containing the main power supply defined by servo amplifier 50. Sections A2 and B2 are interconnected by a pair of conductors 51, 52 to which the output of amplifier 50 is connected.

Located in the motor-containing section A2 is a rectifier 53 with an input connected between conductors 51,52 and whose output is connected through a voltage regulator to the power input of a commutator module 55. The regulator 54, commutator module 55, motor stator coils 56 and motor 57, stator switching network 58 and rotor position sensors are part of section A2. The stator coils 56 are Y-connected with their junction point being connected to conductor 51. Each of the outer terminals of stator coils 56 is connected through a respective solid state switch circuit 60 to conductor 52. The switch circuit 60 is connected to and controlled by respective commutation signal outputs of module 55 whose control inputs are connected to respective sensors 59.

The operation of the network last described, except as indicated above, is similar to that of the last described embodiment. However, since only one phase at a time is excited, there is a 65 percent reduction in motor conversion efficiency but there is a 50 percent reduction in the power components.

While there have been described and illustrated preferred embodiments of the present invention, it is apparent that numerous alterations, omissions and additions may be made without departing from the spirit thereof.

What is claimed is:

1. A brushless DC motor network comprising a polyphase motor including stator coils and a rotor, a motor energizing main voltage supply, a commutation signal responsive switching circuit connecting predetermined stator coils to said main voltage supply, means for sensing the angular position of said rotor, a commutation circuit responsive to said sensing means for applying commutation signals to said switching circuit, said motor network being characterized by said rotor position sensing means and said switching circuit being located in a first section and said main voltage supply being located in a second section remotely spaced from said first section and having a motor control variable voltage output including a periodically varying component, said motor network further comprising a pair of power conductors connected to said voltage output and extending said second section to said first section and an auxiliary power supply having an energizing input coupled to said conductors and a DC output energizing said commutation circuit.

2. The motor network of claim 1 wherein said main voltage supply includes a power amplifier whose output is coupled to said conductors, said power amplifier is responsive to an input signal.

3. The motor network of claim 2 wherein said power amplifier output is manually adjustable.

4. The motor network of claim 2 wherein said power amplifier output is DC amplitude modulated and including a low pass fitter coupling said output to said conductors.

5. The motor network of claim 2 wherein said power amplifier has a pulse width modulated output.

6. The motor network of claim 5 wherein said auxiliary power supply includes a rectifier circuit having an input connected across said conductors, a DC output, and a voltage regulator connected between said DC output and said commutation circuit.

7. The motor network of claim 1 wherein said sensing means includes a voltage input connected to the DC output of said auxiliary power supply.

8. The motor network of claim 1 wherein said first section is located on said motor.

9. The motor network of claim 1 wherein said stator coils are Y-connected and have outer terminals connected in pairs through said switching network to said conductors.

10. The motor network of claim 1 wherein said stator coils are Y-connected, a common junction of said Y-connection is connected to one of said conductors and outer terminals are connected through said switching network to the other of said conductors.

11. A brushless DC motor network comprising a polyphase motor including stator coils and a rotor, a motor energizing main voltage supply having a controlled continuously variable DC output with a periodically varying component, a commutation signal responsive switching circuit connecting predetermined stator coils to said main voltage supply, means for sensing the angular position of said rotor, a commutation circuit responsive to said sensing means for applying commutation signals to said switching circuit, said motor network being characterized by said rotor position sensing means and said switching circuit being located in a first section and said main voltage supply being located in a second section remotely spaced from said first section, said motor network further comprising a pair of power conductors connected to said variable DC output and extending said second section to said first section, an auxiliary power supply included in said first section and having a DC output energizing said communication circuit and having an energizing input connected across said power conductors and being energized by said periodically varying component.

12. A brushless DC motor network comprising a polyphase motor including stator coils and a rotor, a motor energizing main voltage supply including a signal responsive power amplifier having a DC amplitude modulated output and an oscillator having an AC output, a commution signal responsive switching circuit connecting predetermined stator coils to said main voltage supply, means for sensing the angular position of said rotor, a commutation circuit responsive to said sensing means for applying commutation signals to said switching circuit, said motor network being characterized by said rotor position sensing means and said switching circuit being located in a first section and said main voltage supply being located in a second section remotely spaced from said first section, said motor network further comprising a pair of power conductors extending between said first and second sections, said power amplifier output being connected to said power conductors through a low pass filter, said oscillator AC output being AC coupled to said power conductors, and an auxiliary power supply having an input coupled to said conductors and a DC output energizing said commutation circuit.

13. The motor network of claim 12 wherein said oscillator has an output between 200 Khz and 500 Khz.

14. The motor network of claim 12 including a polarity control circuit, energized by said auxiliary power supply and having an input connected through a low-pass filter to said conductors and a direction control signal output, said commutation circuit having a direction control input connected to said polarity control circuit output.

* * * * *